(12) United States Patent
Marlett et al.

(10) Patent No.: US 9,151,203 B2
(45) Date of Patent: Oct. 6, 2015

(54) HUMIDITY CORRECTIONS FOR FUEL SETPOINT ADAPTATION

(71) Applicant: GM GLOBAL TECHNOLOGY OPERATIONS LLC, Detroit, MI (US)

(72) Inventors: Chad E. Marlett, Plymouth, MI (US); Michele Bastianelli, Ancona (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 527 days.

(21) Appl. No.: 13/660,178

(22) Filed: Oct. 25, 2012

(65) Prior Publication Data

US 2014/0121948 A1 May 1, 2014

(51) Int. Cl.
*F02D 41/00* (2006.01)
*F01N 9/00* (2006.01)
*G01N 33/00* (2006.01)

(52) U.S. Cl.
CPC ............ *F01N 9/00* (2013.01); *F01N 2560/025* (2013.01); *F01N 2900/1628* (2013.01); *Y02T 10/47* (2013.01)

(58) Field of Classification Search
CPC ................ F01N 9/00; F01N 2560/025; F01N 2900/1628; F02D 41/00; F02D 41/32; F02D 17/02; G01N 33/00; Y02T 10/47
See application file for complete search history.

(56) References Cited

U.S. PATENT DOCUMENTS

| 5,735,245 A | 4/1998 | Kubesh | |
|---|---|---|---|
| 8,091,413 B2* | 1/2012 | Saito et al. | 73/114.33 |
| 2014/0202426 A1* | 7/2014 | Surnilla et al. | 123/349 |

FOREIGN PATENT DOCUMENTS

| DE | 19750496 A1 | 5/1999 |
|---|---|---|
| DE | 102006011722 B3 | 4/2007 |

* cited by examiner

*Primary Examiner* — Hieu T Vo

(57) ABSTRACT

A method for adjusting an oxygen sensor measurement within an exhaust gas feedstream output from an internal combustion engine based on humidity includes monitoring relative humidity of ambient air obtained from a humidity sensor. Specific humidity at the oxygen sensor is modeled based on the relative humidity. The oxygen sensor measurement is adjusted based on the modeled specific humidity at the oxygen sensor.

18 Claims, 2 Drawing Sheets

HUMIDITY CORRECTIONS FOR FUEL SETPOINT ADAPTATION

TECHNICAL FIELD

This disclosure is related to operation and control of internal combustion engines.

BACKGROUND

The statements in this section merely provide background information related to the present disclosure. Accordingly, such statements are not intended to constitute an admission of prior art.

Diesel engines manage air-fuel ratios (AFR), pressure and temperature to achieve robust combustion. An oxygen sensor, e.g., lambda sensor, disposed in an exhaust gas feedstream output from an engine is commonly employed for providing feedback control for the AFR of the engine to reduce vehicle emissions by ensuring that the engine is efficiently combusting fuel. The measurement provided by the oxygen sensor is a difference between the amount of oxygen in the exhaust gas feedstream and an oxygen content of ambient air. It is known, for example, to assume an ideal oxygen content of ambient air to be 20.95%. However, an actual oxygen content of ambient air varies due to humidity. For instance, as humidity increases the oxygen content of ambient air decreases to values lower than 20.95%.

It is known to employ fuel set point adaptation by adjusting boost to the engine and external exhaust gas recirculation to the engine. Fuel set point adaptation strategies are dependent upon feedback provided by the oxygen sensor, e.g., lambda sensor. Errors in the fuel set point adaptation strategies can result when the ideal oxygen content of ambient air is assumed without taking into account humidity.

It is known to employ a fuel injection system for injecting fuel into the engine. The fuel system utilizes fuel injectors which require an energizing time to inject a fuel mass into the engine. Over the life of the vehicle, energizing times are required to be increased to maintain a desired injected fuel mass. It is known to offset or adjust a predetermined energizing time based on feedback provided by the oxygen sensor during each drive cycle. However, this offset or adjustment to the predetermined energizing time can result in an error when the ideal oxygen content of ambient air is assumed without taking into account variations in humidity.

It is known that deterioration of sensing elements of the oxygen sensor occur over time resulting in oxygen sensor aging where the oxygen sensor becomes less sensitive to oxygen over time. Learned offsets can be employed to the feedback provided by the oxygen sensor to account for oxygen sensor aging. However, these learned offsets can result in an error when the ideal oxygen content of ambient air is assumed without taking into account variations in humidity.

SUMMARY

A method for adjusting an oxygen sensor measurement within an exhaust gas feedstream output from an internal combustion engine based on humidity includes monitoring relative humidity of ambient air obtained from a humidity sensor. Specific humidity at the oxygen sensor is modeled based on the relative humidity. The oxygen sensor measurement is adjusted based on the modeled specific humidity at the oxygen sensor.

BRIEF DESCRIPTION OF THE DRAWINGS

One or more embodiments will now be described, by way of example, with reference to the accompanying drawings, in which.

DETAILED DESCRIPTION

Figure 1:
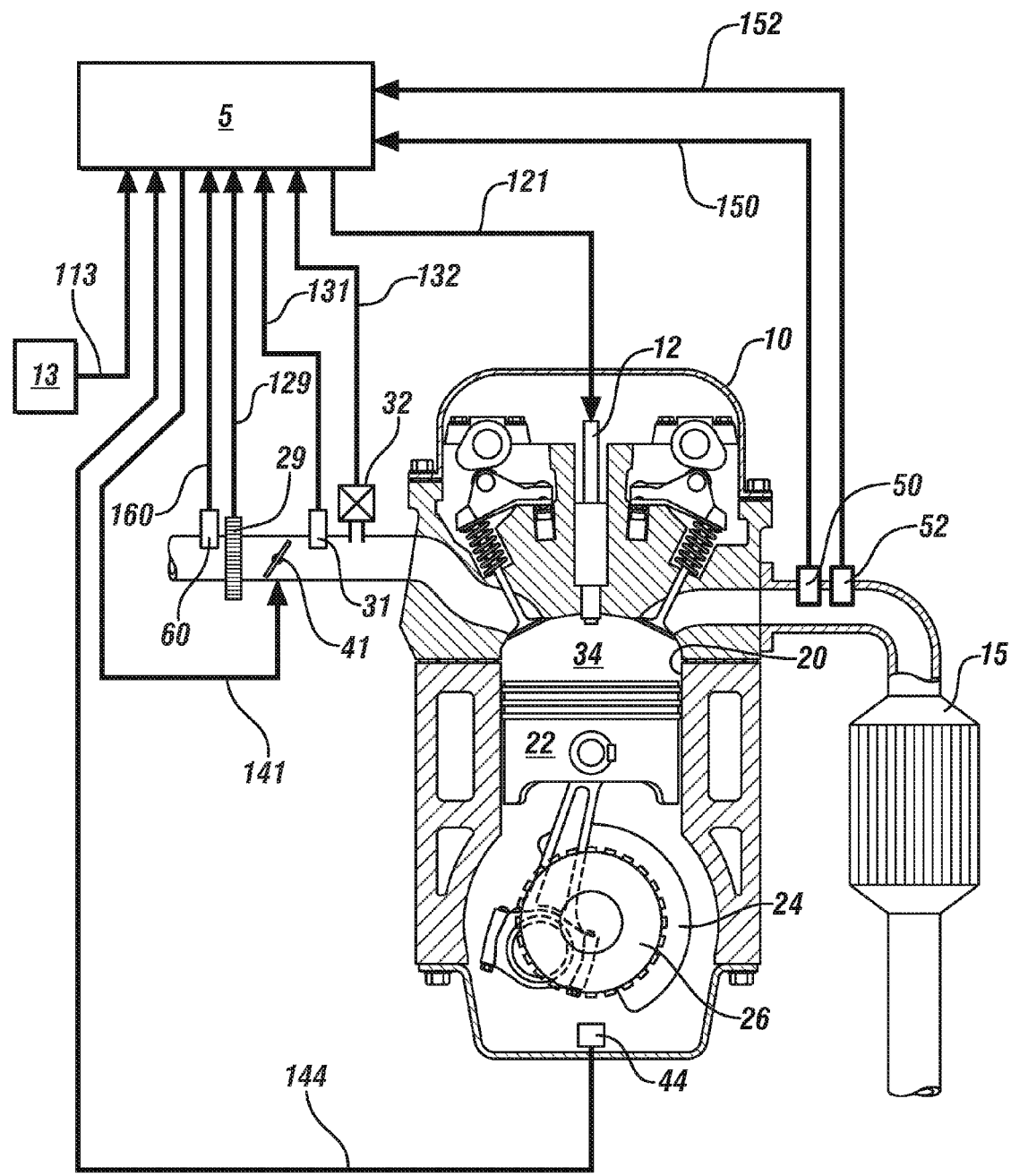
FIG. 1 illustrates an internal combustion engine and an accompanying engine control module, in accordance with the present disclosure.

Referring now to the drawings, wherein the showings are for the purpose of illustrating certain exemplary embodiments only and not for the purpose of limiting the same, FIG. 1 illustrates an internal combustion engine 10 and an accompanying engine control module 5 in accordance with the present disclosure. The exemplary engine is a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request (T$_{O\_REQ}$) 113. The T$_{O\_REQ}$ 113 can be determined by a user interface 13 that is preferably signally connected to a plurality of devices through which a vehicle operator directs and commands operation of a powertrain system. The devices may include an accelerator pedal, an operator brake pedal, a transmission range selector (PRNDL) and a vehicle speed cruise control system. The user interface 13 may include a single device, as shown, or alternatively may include a plurality of user interface devices.

The engine preferably employs a four-stroke operation wherein each engine combustion cycle includes 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to and rotates with the crankshaft. The engine includes sensing devices to monitor engine operation, and actuators which control engine operation. The sensing devices and actuators are signally or operatively connected to control module 5.

The engine includes a variable volume combustion chamber defined by the piston reciprocating within the cylinder between top-dead-center and bottom-dead-center points and a cylinder head including an intake valve and an exhaust valve. The piston reciprocates in repetitive cycles including intake, compression, expansion, and exhaust strokes.

The engine preferably has an air-fuel operating regime that is primarily lean of stoichiometry. Aspects of the disclosure are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. In diesel cycle engines, combustion timing is generally coincident with the main fuel injection near top dead center, whereas in controlled auto-ignition or homogeneous charge compression ignition engines fuel injection is earlier in the combustion cycle and ignition timing is controlled near top dead center in accordance with control of in-cylinder conditions (including temperature and pressure) and may include a spark assist from an ignition source during, for example, low speed and low load engine operation.

The engine is adapted to operate over a broad range of temperatures, cylinder charge (air, fuel, and EGR) and injection events. The engine can utilize multiple fuel injection events per cylinder per engine cycle, e.g., a system employing a pilot injection for fuel reforming, a main injection event for engine power, and where applicable a post-combustion fuel injection event for aftertreatment management.

Sensing devices are installed on or near the engine to monitor physical characteristics and generate signals which are correlatable to engine and ambient parameters. The sensing devices include a crankshaft rotation sensor, including a crank sensor 44 for monitoring crankshaft speed (RPM) through sensing edges on the teeth of the multi-tooth target wheel 26. The crank sensor may include, e.g., a Hall-effect sensor, an inductive sensor, or a magnetoresistive sensor. Other sensing devices include a manifold pressure sensor 31 for monitoring manifold pressure and a mass air flow sensor 29 for monitoring intake mass air flow and intake air temperature. In one embodiment, the mass air flow sensor is included within a Turbocharger Compressor Inlet Air Pressure (TCIAP) device that can obtain ambient air pressure through modeling. In another embodiment, a separate barometric pressure sensor can be utilized to obtain ambient air pressure. Output signals 131 and 129 obtained by the manifold pressure sensor 31 and the mass air flow sensor 29, respectively, are input to the control module 5. Humidity sensor 60 is located proximate to the mass air flow sensor 29 upstream of an engine 10 and is configured to monitor relative humidity of ambient air. In one embodiment, the humidity sensor 60 is installed in conjunction with the mass air flow sensor 29 within the TCIAP device. Output signal 160, including the relative humidity of ambient air, is input to the control module 5. Exhaust gas sensor 50 for monitoring one or more exhaust gas parameters, including, but not limited to exhaust gas flow rate, exhaust gas temperature and exhaust gas pressure. Output signal 150, including the exhaust gas temperature and one or more exhaust gas parameters, is input to the control module 5. In one embodiment, the exhaust gas pressure can be modeled based on the exhaust gas flow rate. Oxygen sensor 52 measures oxygen content in the exhaust gas feedstream output from the engine 10. The oxygen sensor 52 can be referred to as a lambda sensor providing a measurement that includes a difference between the oxygen content in the exhaust gas feedstream and an oxygen content of ambient air. Output signal 152 is input to the control module. One having ordinary skill in the art understands that there may be other sensing devices and methods for purposes of control and diagnostics. The engine is preferably equipped with other sensors for monitoring operation and for purposes of system control. Each of the sensing devices is signally connected to the control module 5 to provide signal information which is transformed by the control module to information representative of the respective monitored and/or parameter. It is understood that this configuration is illustrative, not restrictive, including the various sensing devices being replaceable with functionally equivalent devices and routines.

The actuators are installed on the engine and controlled by the control module 5 in response to operator inputs to achieve various performance goals. Actuators include an electronically-controlled throttle device 41 which controls throttle opening to a commanded input 141, and a plurality of fuel injectors 12 for directly injecting fuel into each of the combustion chambers in response to a commanded input 121, all of which are controlled in response to the operator torque request ($T_{O\_REQ}$) 113. There is an exhaust gas recirculation valve 32 and cooler, which controls flow of externally recirculated exhaust gas to the engine intake, in response to a control signal 132 from the control module 5.

The fuel injector 12 is an element of a fuel injection system, which includes a plurality of high-pressure fuel injector devices each adapted to directly inject a fuel charge, including a mass of fuel, into one of the combustion chambers in response to the command signal 121 from the control module 5. Each of the fuel injectors 12 is supplied pressurized fuel from a fuel distribution system and have operating characteristics including a minimum pulsewidth and an associated minimum controllable fuel flow rate, and a maximum fuel flowrate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction set(s) including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The control module 5 executes routines stored therein to control the aforementioned actuators to control engine operation, including throttle position, fuel injection mass and timing, EGR valve position to control flow of recirculated exhaust gases, and control of intake and/or exhaust valve timing, phasing, and lift on systems so equipped. The control module is configured to receive input signals from the operator (e.g., a throttle pedal position and a brake pedal position) to determine the operator torque request 113, $T_{O\_REQ}$, and from the sensors indicating the engine speed and intake air temperature, and coolant temperature and other ambient conditions.

As aforementioned, the measurement provided by the oxygen sensor 52 is a difference between the amount of oxygen content in the exhaust gas feedstream and an oxygen content of ambient air. Assuming an ideal oxygen content of ambient air, for example 20.95%, can result in errors to the measurement provided by the oxygen sensor 52 due to variations in relative humidity. For instance, at 30° C. and 80% relative humidity, an actual air oxygen content is about 20.10%. Hence, the oxygen content of air decreases as the humidity increases. Discussed in greater detail herein, the oxygen sensor 52 measurement can be adjusted based on monitored relative humidity of ambient air obtained from the humidity sensor 60.

Figure 2:
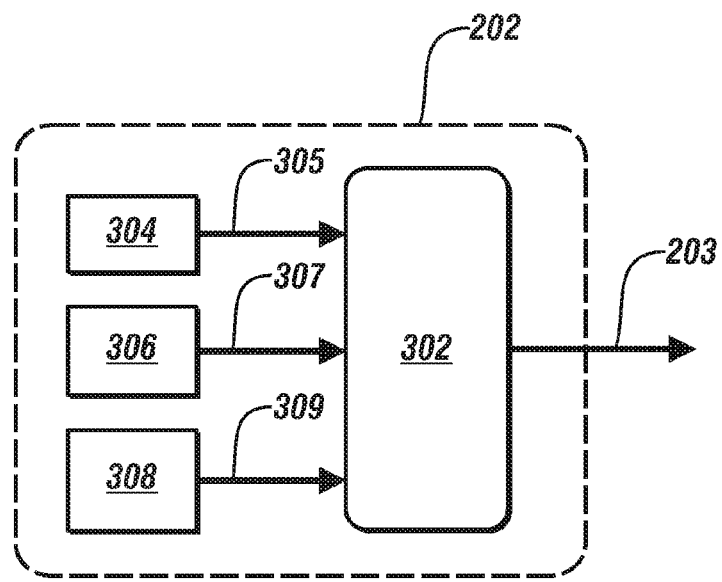
FIG. 2 illustrates a humidity compensation controller 200 for adjusting an oxygen sensor measurement within an exhaust gas feedstream output from the internal combustion engine, which is described with reference to the internal combustion engine 10 of FIG. 1, in accordance with the present disclosure.

FIG. 2 illustrates a humidity compensation controller 200 for adjusting an oxygen sensor measurement within an exhaust gas feedstream output from the internal combustion engine, which is described with reference to the internal combustion engine 10 and the control module 5 of FIG. 1, in accordance with the present disclosure. The humidity compensation controller 200 is implemented within the control module 5 and includes a specific humidity module 202, an exhaust temperature module 204, an exhaust pressure module 206, an oxygen sensor measurement module 208, a specific humidity correction module 210, an oxygen content correction module 212, a first multiplier 214 and a second multiplier 216.

Figure 3:
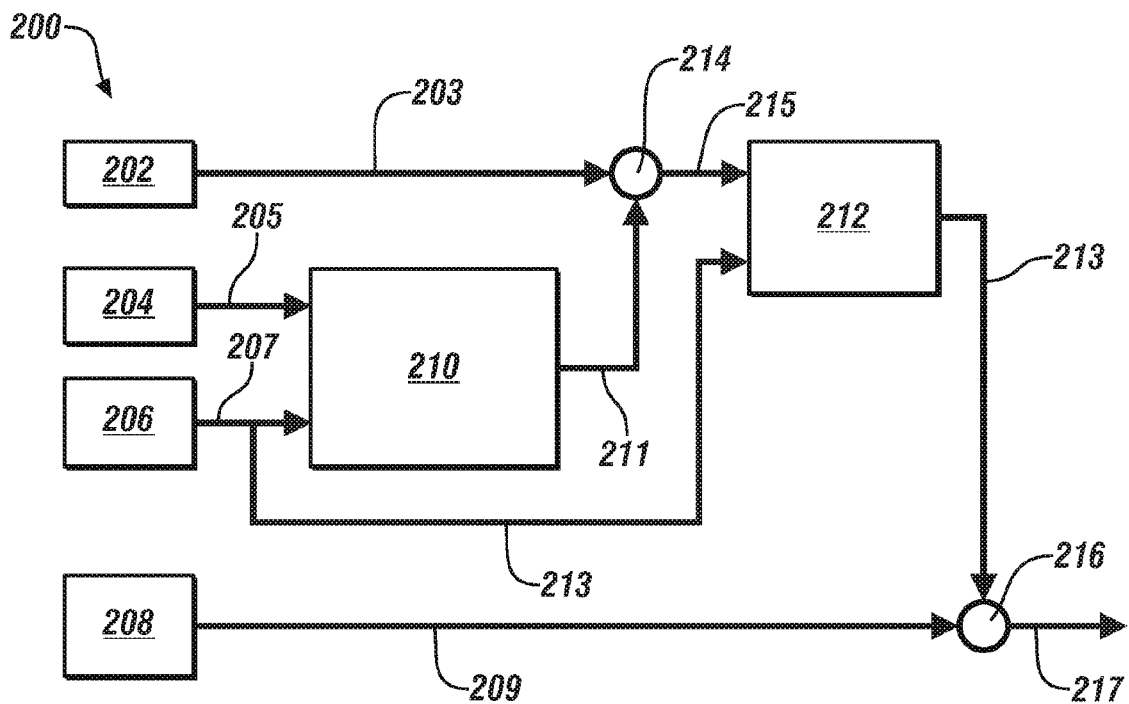
FIG. 3 illustrates a specific humidity module 202 for determining specific humidity of ambient air, which is described with reference to the humidity compensation controller 200 of FIG. 2, in accordance with the present disclosure.

The specific humidity module 202 determines specific humidity 203 of ambient air based on monitored relative humidity, temperature of intake mass airflow and monitored pressure of intake mass airflow entering the internal combustion engine 10 of FIG. 1. Referring to FIG. 3, the specific humidity module 202 is described in detail. The specific humidity module 202 includes a specific humidity determination module 302, a relative humidity module 304, an intake temperature module 306 and an intake pressure module 308. The relative humidity module 304 outputs relative humidity 305 of ambient air obtained from a humidity sensor, i.e., humidity sensor 60 of FIG. 1. The intake temperature module 306 outputs temperature 307 of an intake mass airflow entering the internal combustion engine. The temperature can be obtained from the mass airflow sensor 29 of FIG. 1. The intake pressure module 308 outputs pressure 309 of the intake mass airflow entering the internal combustion engine. In one embodiment, the pressure 309 of the intake mass airflow entering the internal combustion engine can be determined from measurements obtained from the mass airflow sensor 29. The humidity determination module 302 monitors the relative humidity 305 and the temperature 307 and pressure 309 of the intake mass airflow entering the engine and determines the specific humidity 203 at the humidity sensor 60. The specific humidity 203 of the ambient air is input to the first multiplier 214. As aforementioned, the mass air flow sensor 29 and the humidity sensor 60 installed in conjunction therewith can be included within a TCIAP device configured monitor the relative humidity 305 and the temperature 307 and pressure 309 of the intake mass airflow entering the engine, wherein the specific humidity 203 is determined at the TCIAP device.

Referring back to FIG. 2, the exhaust temperature module 204 outputs an exhaust gas temperature 205. The exhaust gas temperature 205 can be obtained from the exhaust sensor 50 and corresponds to temperature of the exhaust gas feedstream output from the engine. The exhaust pressure module 206 outputs an exhaust gas pressure 207. The exhaust gas pressure 207 can be modeled as a function of the exhaust flow rate obtained from the exhaust sensor 50 and corresponds to pressure of the exhaust gas feedstream output from the engine.

The specific humidity correction module 210 monitors the temperature 205 and pressure 207 of the exhaust gas feedstream output from the engine 10. The specific humidity correction module 210 includes a model for determining a specific humidity correction factor 211 based on the monitored exhaust gas temperature 205 and the monitored exhaust gas pressure 207. Accordingly, the specific humidity correction factor 211 is input to the first multiplier 214 and multiplied by the specific humidity 203 of the ambient air. The first multiplier 214 outputs a modeled specific humidity 215 at the oxygen sensor 52 based on the specific humidity 203 of the ambient air and the specific humidity correction factor 211.

The oxygen content correction module 212 monitors the exhaust gas pressure 207 and the modeled specific humidity 215 at the oxygen sensor 52. The oxygen content correction module 212 can include a model for modeling an oxygen content correction factor 213 based on the modeled specific humidity 215 at the oxygen sensor 52 and the monitored exhaust gas pressure 207. The oxygen content correction factor 213 can correlate to the actual oxygen content of the ambient air taking into account the relative humidity of the ambient air obtained from the humidity sensor 29. As aforementioned, increases in relative humidity decrease the actual oxygen content. Conversely, decreases in relative humidity increase the actual oxygen content. The oxygen content correction factor 213 is input to the second multiplier 216.

The oxygen sensor measurement module 208 outputs an oxygen sensor measurement 209 that is input to the second multiplier 216. The oxygen sensor measurement 209 can be provided by the oxygen sensor 52 and can include the difference between the amount of oxygen content in the exhaust gas feedstream and the oxygen content of ambient air. As aforementioned, the oxygen content of ambient air is assumed at a fixed value corresponding to the ideal oxygen content of 20.95%, and hence, does not take into account relative humidity. Assuming the oxygen content at a fixed value can result in errors of the oxygen sensor measurement 209 that may be provided as feedback for determining fuel set point adaptation strategies; small quantity adaptation strategies and learned offsets applied to the oxygen sensor 52 to compensate for oxygen sensor aging. The oxygen sensor measurement 209 is input to the second multiplier 216.

The second multiplier 216 adjusts the oxygen sensor measurement 209 based on the modeled oxygen content correction factor 213 and outputs an adjusted oxygen sensor measurement 217. Thus, the oxygen sensor measurement 209 is adjusted based on the modeled specific humidity at the oxygen sensor, wherein the specific humidity at the oxygen sensor is modeled based on the monitored relative humidity obtained from the humidity sensor 29. Accordingly, the adjusted oxygen sensor measurement 217 includes a difference between the amount of oxygen content in the exhaust gas feedstream and an actual oxygen content of ambient error due to variations in relative humidity of the ambient air.

In an exemplary embodiment, the adjusted oxygen sensor measurement 217 can be provided as feedback for determining fuel set point adaptation strategies. Fuel set point adaptation strategies can compensate for injected fuel mass errors by adjusting one or both of external exhaust gas recirculation and intake air mass boost. Intake air mass boost can be provided by compressing air entering the engine through the use of turbochargers and/or superchargers. The injected fuel mass error can be determined based on a difference between a monitored intake mass airflow and the adjusted oxygen sensor measurement 217. In one embodiment, the injected fuel mass error is only determined if the difference between the monitored intake mass airflow and the adjusted oxygen sensor measurement 217 violates an error threshold. If the injected fuel mass error is negative, i.e., the adjusted oxygen content measurement 217 is less than the intake mass airflow, the external exhaust gas recirculation entering the internal combustion engine can be decreased and/or the intake mass airflow boost entering the internal combustion engine can be increased. If the injected fuel mass error is positive, i.e., the adjusted oxygen content measurement 217 is greater than the intake mass airflow, the external exhaust gas recirculation entering the internal combustion engine can be increased and/or the intake mass airflow boost entering the internal combustion engine can be decreased.

In another exemplary embodiment, the adjusted oxygen sensor measurement 217 can be provided as feedback for determining small quantity adaptation strategies. As aforementioned, the fuel injectors require an energizing time to inject the fuel mass into the combustion chambers of the engine. An energizing time too low can result in no fuel being injected from the fuel injector and an energizing time too high can result in too much fuel being injected from the fuel injector. Accordingly, an energizing time is predetermined to achieve a desired injected fuel mass. The predetermined energizing time can include a minimum energizing time for the fuel injector to inject a fuel mass achieving the desired injected fuel mass. The fuel mass can be injected in pulses during pilot injection events. It will be appreciated that the energizing time increases over the life of the vehicle to maintain the same desired injected fuel mass. In an exemplary embodiment, the predetermined energizing time is varied during vehicle coasting. The adjusted oxygen sensor measurement 217 is monitored during the varied energizing time and the predetermined energizing time to achieve the desired injected fuel mass can be adjusted in response to a change in the adjusted oxygen sensor measurement 217. In a non-limiting example, the predetermined energizing time is increased by a magnitude proportional to a magnitude that the change in the adjusted oxygen sensor measurement decreases to achieve the desired injected fuel mass.

In another exemplary embodiment, the adjusted oxygen sensor measurement 217 can be provided as feedback for adjusting a learned aging offset applied to the oxygen sensor measurement to compensate for oxygen sensor 52 aging. The learned aging offset accounts for deterioration of sensing elements of the oxygen sensor 52 that occur over time resulting in the oxygen sensor 52 becoming less sensitive to oxygen over time. Accordingly, the learned aging offset applied to the oxygen sensor measurement can be adjusted based on the adjusted oxygen sensor measurement during each drive cycle to account for humidity variation.

Referring back to FIG. 1, exemplary embodiments include the humidity sensor 60 installed in conjunction with the mass airflow sensor 29 included within a TCIAP device. Further, pressure of the intake mass airflow can be modeled based on the mass airflow rate obtained by the mass airflow sensor 29. Accordingly, the humidity sensor 60 installed in conjunction with the mass airflow sensor 29 can be configured to monitor relative humidity of ambient air, pressure of the intake mass airflow entering the engine and temperature of the intake mass airflow entering the engine to determine specific humidity at the mass air flow sensor 29, i.e., at the TCIAP device.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus for adjusting an oxygen sensor measurement within an exhaust gas feedstream output from an internal combustion engine, comprising:
   the oxygen sensor disposed within the exhaust gas feedstream output from the internal combustion engine and configured to provide a measurement that includes a difference between the oxygen content in the exhaust gas feedstream and an ideal oxygen content of ambient air;
   a mass airflow sensor disposed upstream of the internal combustion engine and configured to obtain temperature and pressure of an intake mass airflow entering the internal combustion engine,
   a humidity sensor located proximate to the mass airflow sensor and configured to obtain relative humidity of ambient air;
   an exhaust gas sensor disposed within the exhaust gas feedstream output from the internal combustion engine and configured to obtain temperature and pressure of the exhaust gas feedstream; and
   a control module
      monitoring the relative humidity of the ambient air obtained from the humidity sensor,
      modeling specific humidity at the oxygen sensor based on the relative humidity, and
      adjusting the oxygen sensor measurement based on the specific humidity at the oxygen sensor.

2. A method for adjusting an oxygen sensor measurement within an exhaust gas feedstream output from an internal combustion engine, comprising:
   monitoring relative humidity of ambient air obtained from a humidity sensor;
   modeling specific humidity at the oxygen sensor based on the monitored relative humidity; and
   adjusting the oxygen sensor measurement based on the modeled specific humidity at the oxygen sensor.

3. The method of claim 2 wherein the humidity sensor is located proximate to a mass airflow sensor disposed upstream of the internal combustion engine.

4. The method of claim 2 wherein modeling specific humidity at the oxygen sensor based on the monitored relative humidity comprises:
   monitoring temperature and pressure of the exhaust gas feedstream output from the internal combustion engine;
   monitoring pressure and temperature of an intake mass airflow entering the internal combustion engine;
   determining specific humidity of the ambient air based on the monitored relative humidity and the monitored pressure and temperature of the intake mass air flow entering the internal combustion engine; and
   modeling the specific humidity at the oxygen sensor based on the specific humidity of the ambient air and the monitored temperature and pressure of the exhaust gas feedstream output from the internal combustion engine.

5. The method of claim 4 wherein modeling the specific humidity at the oxygen sensor based on the specific humidity of the ambient air and the monitored temperature and pressure of the exhaust gas feedstream output from the internal combustion engine comprises:
   determining a specific humidity correction factor based on the monitored pressure and temperature of the exhaust gas feedstream;

modeling the specific humidity at the oxygen sensor based on the specific humidity of the ambient air and the specific humidity correction factor.

6. The method of claim 2 wherein adjusting the oxygen sensor measurement based on the modeled specific humidity at the oxygen sensor comprises:
monitoring pressure of the exhaust gas feedstream:
modeling an oxygen content correction factor based on the modeled specific humidity at the oxygen sensor and the monitored pressure of the exhaust gas feedstream;
adjusting the oxygen sensor measurement based on the modeled oxygen content correction factor.

7. The method of claim 2 further comprising:
monitoring an intake mass airflow entering the internal combustion engine:
determining an injected fuel mass error based on a difference between the monitored intake mass airflow and the adjusted oxygen sensor measurement;
when the injected fuel mass error is negative, decreasing external exhaust gas recirculation entering the internal combustion engine; and
when the injected fuel mass error is positive, increasing the external exhaust gas recirculation entering the internal combustion engine.

8. The method of claim 2 further comprising:
monitoring an intake mass airflow entering the internal combustion engine:
determining an injected fuel mass error based on a difference between the monitored intake mass airflow and the adjusted oxygen sensor measurement;
when the injected fuel mass error is negative, increasing intake mass airflow boost entering the internal combustion engine; and
when the injected fuel mass error is positive, decreasing intake mass airflow boost entering the internal combustion engine.

9. The method of claim 2 further comprising:
monitoring a learned aging offset applied to the oxygen sensor measurement to compensate for oxygen sensor aging; and
adjusting the learned aging offset applied to the oxygen sensor measurement based on the adjusted oxygen sensor measurement during each drive cycle.

10. The method of claim 2 further comprising:
during vehicle coasting, varying an energizing time of a fuel injector from a predetermined energizing time intended to achieve a desired injected furl mass;
monitoring the adjusted oxygen sensor measurement during the varied energizing time;
adjusting the predetermined energizing time based upon the adjusted oxygen sensor measurement such that the adjusted predetermined energizing time achieves the desired injected fuel mass.

11. The method of claim 10 wherein the predetermined energizing time comprises a minimum energizing time for a fuel injector to inject a fuel mass achieving the desired injected fuel mass during a pilot injection.

12. The method of claim 10 wherein adjusting the predetermined energizing time comprises:
increasing the predetermined energizing time by a magnitude proportional to a magnitude that the change in the adjusted oxygen sensor measurement decreases.

13. A method for adjusting an oxygen sensor measurement within an exhaust gas feedstream output from an internal combustion engine, comprising:
monitoring relative humidity of ambient air obtained from a humidity sensor disposed upstream of the engine;
monitoring the oxygen sensor measurement;
modeling specific humidity at the oxygen sensor based on the monitored relative humidity of the ambient air comprising:
monitoring exhaust gas parameters of an exhaust gas feedstream output from the engine,
monitoring intake mass airflow parameters of an intake mass airflow entering the engine,
determining specific humidity of the ambient air based on the monitored relative humidity and the monitored intake mass airflow parameters, and
modeling the specific humidity at the oxygen sensor based on the specific humidity of the ambient air and the monitored exhaust gas parameters;
modeling an oxygen content correction factor based on the modeled specific humidity at the oxygen sensor and one of the monitored exhaust gas parameters; and
adjusting the oxygen sensor measurement based on the modeled oxygen content correction factor.

14. The method of claim 13 wherein the intake mass airflow parameters comprise an intake mass airflow temperature and an intake mass airflow pressure.

15. The method of claim 13 wherein the exhaust gas parameters comprise an exhaust gas temperature and an exhaust gas pressure.

16. The method of claim 13 further comprising:
providing the adjusted oxygen sensor measurement as feedback for determining fuel set point adaptation to compensate for an injected fuel mass error by adjusting at least one external exhaust gas recirculation and intake air mass boost.

17. The method of claim 13 further comprising:
during vehicle coasting, varying an energizing time of a fuel injector from a predetermined energizing time intended to achieve a desired injected furl mass;
monitoring the adjusted oxygen sensor measurement during the varied energizing time;
adjusting the predetermined energizing time based upon the adjusted oxygen sensor measurement such that the adjusted predetermined energizing time achieves the desired injected fuel mass.

18. The method of claim 13 further comprising:
providing the adjusted oxygen sensor measurement as feedback for adjusting a learned aging offset applied to the oxygen sensor measurement to compensate for oxygen sensor aging during each drive cycle.

* * * * *